(12) United States Patent
Lee et al.

(10) Patent No.: US 8,326,019 B2
(45) Date of Patent: *Dec. 4, 2012

(54) APPARATUS, METHOD, AND MEDIUM FOR DIVIDING REGIONS BY USING FEATURE POINTS AND MOBILE ROBOT USING THE SAME

(75) Inventors: Su-jinn Lee, Yongin-si (KR); Hyeon Myeong, Yongin-si (KR); Yong-beom Lee, Seoul (KR); Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 5 days.

This patent is subject to a terminal disclaimer.

(21) Appl. No.: 13/050,459

(22) Filed: Mar. 17, 2011

(65) Prior Publication Data

US 2011/0211731 A1    Sep. 1, 2011

Related U.S. Application Data

(63) Continuation of application No. 11/822,407, filed on Jul. 5, 2007, now Pat. No. 7,916,931.

(30) Foreign Application Priority Data

Jul. 5, 2006    (KR) .................... 10-2006-0063155

(51) Int. Cl.
*G06K 9/00*    (2006.01)
*G05B 19/04*    (2006.01)
*G05B 19/18*    (2006.01)
*G01C 22/00*    (2006.01)
*G05D 1/00*    (2006.01)

(52) U.S. Cl. ........ 382/153; 382/154; 382/103; 382/106; 700/253; 700/255; 701/23; 701/25; 901/1

(58) Field of Classification Search .................. None
See application file for complete search history.

(56) References Cited

U.S. PATENT DOCUMENTS 4,862,373 A * 8/1989 Meng ............................ 701/423
(Continued)

FOREIGN PATENT DOCUMENTS

JP    2002-287824    10/2002
(Continued)

OTHER PUBLICATIONS

Se, et al., "Vision Based Global Localization and Mapping for Mobile Robots", IEEE Trans on Robotics, vol. 21, No. 3, 2005, pp. 364-375.*

(Continued)

*Primary Examiner* — Tom Y Lu
*Assistant Examiner* — Thomas Conway
(74) *Attorney, Agent, or Firm* — Staas & Halsey LLP

(57) ABSTRACT

An apparatus, method, and medium for dividing regions by using feature points and a mobile robot cleaner using the same are provided. A method includes forming a grid map by using a plurality of grid points that are obtained by detecting distances of a mobile robot from obstacles; extracting feature points from the grid map; extracting candidate pairs of feature points, which are in the range of a region division element, from the feature points; extracting a final pair of feature points, which satisfies the requirements of the region division element, from the candidate pair of feature points; forming a critical line by connecting the final pair of feature points; and forming a final region in accordance with the size relationship between regions formed of a closed curve which connects the critical line and the grid map.

53 Claims, 13 Drawing Sheets

U.S. PATENT DOCUMENTS

| | | | |
|---|---|---|---|
| 7,539,563 B2 * | 5/2009 | Yang et al. | 701/24 |
| 7,765,499 B2 * | 7/2010 | De Graeve et al. | 706/20 |
| 7,916,931 B2 * | 3/2011 | Lee et al. | 382/153 |
| 2003/0030399 A1 * | 2/2003 | Jacobs | 318/568.16 |
| 2005/0171636 A1 * | 8/2005 | Tani | 700/245 |
| 2007/0244610 A1 * | 10/2007 | Ozick et al. | 701/23 |

FOREIGN PATENT DOCUMENTS

| | | | |
|---|---|---|---|
| JP | 2005-211359 | | 8/2005 |
| JP | 2005-211367 | | 8/2005 |
| JP | 2005211367 A | * | 8/2005 |
| KR | 2006-14715 | | 2/2006 |

OTHER PUBLICATIONS

U.S. Appl. No. 11/822,407, filed Jul. 5, 2007, Su-jinn Lee, Sansung Electronics Co., Ltd.

U.S. Notice of Allowance mailed on Nov. 23, 2010 in related U.S. Appl. No. 11/822,407.

* cited by examiner

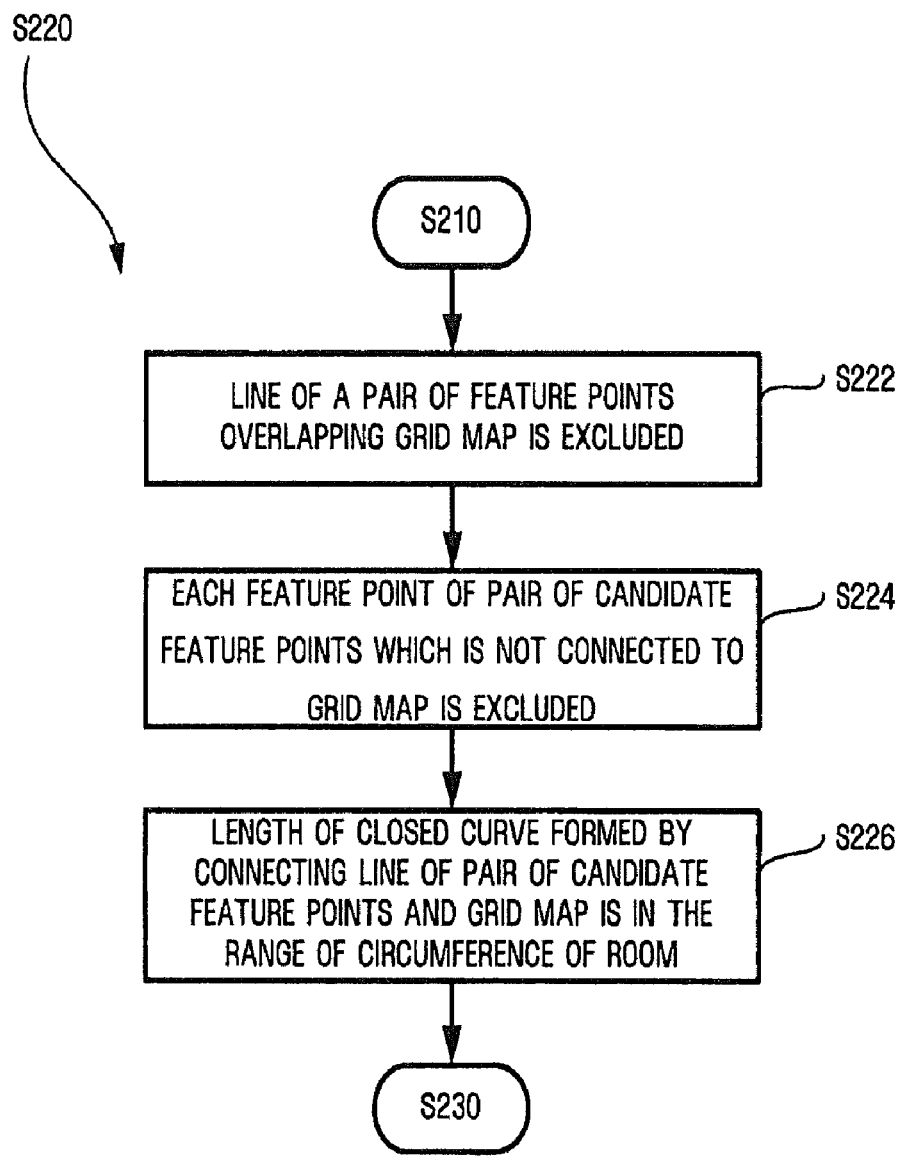

APPARATUS, METHOD, AND MEDIUM FOR DIVIDING REGIONS BY USING FEATURE POINTS AND MOBILE ROBOT USING THE SAME

CROSS-REFERENCE TO RELATED APPLICATIONS

This application is a continuation of application Ser. No. 11/822,407 filed Jul. 5, 2007, now U.S. Pat. No. 7,916,931, the disclosure of which is incorporated herein in its entirety by reference. This application claims the priority of Korean Patent Application No. 2006-0063155, filed on Jul. 5, 2006 in the Korean Intellectual Property Office, the disclosure of which is incorporated herein by reference.

BACKGROUND

1. Field

Embodiments relate to an apparatus, method, and medium for dividing regions by using feature points and a mobile robot using the same and, more particularly, to an apparatus, method, and medium for dividing regions by extracting both end points of a gateway from feature points and a mobile robot using the same.

2. Description of the Related Art

Generally, robots have been developed for industrial purposes to be used in repetitive operations as a part of factory automation. In recent years, in addition to an industrial robot, various kinds of robots have been put to practical use, particularly, a human-friendly robot which moves by itself in a household or an office to work in place of humans. For example, the robots include a robot cleaner, a security robot, a guide robot, a service robot, etc.

In a mobile robot such as a robot cleaner, it is necessary to distinguish regions to clean. For example, in a robot cleaner, if a user gives a command to clean regions such as a room, a living room and a kitchen, the robot cleaner should be capable of distinguishing and recognizing a room, a living room, a kitchen or the like to clean. In order to carry out these operations, the robot should be capable of exactly displaying the entire space as a grid map, and the grid map stored in the robot should be divided into regions (topological map) such as a room and a living room in order to allow a user to give a command to clean the regions.

As a method of dividing regions, there is known a method in which a gate is recognized as a reference for dividing regions. A method of dividing rooms by recognizing entrance doors is disclosed (see, for example, Japanese Patent Laid-Open No. 2005-211359), in which a robot cleaner recognizes signposts installed in the vicinity of entrances of rooms so as to detect doors by using sensors and cameras while moving, thus performing cleaning. Problems are found in this method. A signpost should be installed for each entrance door, which is cumbersome. Accordingly, if entrance doors are many, the cost is high. Further, if a cleaning space is switched, signposts should be newly installed.

FIG. 1 is a view sequentially showing a method of drawing a topological map by detecting a narrow path with a Voronoi diagram. First, when the shortest distance between obstacles is obtained in all grids of a free space, a voronoi diagram is drawn by connecting center points of the shortest distances (FIG. 1B). Each point in the voronoi diagram has a value of the shortest distance from obstacles, in the case in which the shortest distance has a local-minimum, a point of the voronoi diagram, that is, a point of the voronoi diagram having a local-minimum, when an X-axis is defined along the voronoi diagram and the distance to an obstacle of each point is defined as a Y-axis, is determined as a critical point (FIG. 1C). Next, a critical line is drawn by connecting points shortest distant from each critical point (FIG. 1D). This critical line is a narrow path which is extracted by the voronoi diagram. Each region divided by the critical lines becomes a topological region (FIG. 1E).

In the related art, a lot of calculations are needed because the shortest distances from all grids of a free space to the obstacles should be obtained. In addition, since an actual map has too many inconsistencies, unnecessary critical points are generated, such that an unexpected delicate region is generated in a topological map.

Exemplary embodiments described hereinafter overcome the drawbacks inherent in the related and provide an apparatus, method, and medium for dividing regions by detecting a gateway from feature points by reducing the amount of calculations.

SUMMARY

According to an aspect, there is provided a method for dividing regions by using feature points including forming a grid map by using a plurality of grid points that are obtained by detecting distances from obstacles; extracting feature points from the grid map; extracting pairs of candidate feature points included in a range of a region division element, from the feature points; extracting pairs of final feature points, which satisfy requirements of the region division element, from the pairs of candidate feature points; forming a critical line by connecting the pairs of final feature points to each other; and forming a final region in accordance with the size relationship between regions having a closed curve formed by connecting the critical line and the grid map.

According to an aspect, there is provided an apparatus for dividing regions by using feature points. The apparatus may include a grid map forming unit to form a grid map by using a plurality of grid points that are obtained by detecting distances from obstacles; a feature point extracting unit to extract feature points from the grid map; pairs of candidate feature points extracting unit to extract a pair of feature points, which are included within a range of a region division element, from the feature points; pairs of final feature points extracting unit to extract pairs of final feature points, which satisfy requirements of a region division element, from the pairs of candidate feature points; a critical line forming unit to form a critical line by connecting the pairs of final feature points; and a region forming unit to form a final region in accordance with the size relationship between the regions formed of a closed curve which connects the critical line and the grid map.

According to an aspect, there is provided a robot cleaner which uses the apparatus for dividing regions by using feature points. The apparatus may include a grid map forming unit, a feature point extracting unit, candidate pairs of feature points extracting unit, final pairs of feature points extracting unit, a critical line forming unit, a region forming unit, a topological map drawing unit, and a displaying unit, and automatically cleans a region, when a predetermined region of the topological map, which is recognizably displayed on the display device, is selected.

According to an aspect, there is provided a mobile robot having an apparatus for dividing regions by using feature points, the apparatus including a grid map forming unit to form a grid map by using a plurality of grid points that are obtained by detecting distances from obstacles; a feature point extracting unit to extract feature points from the grid map; pairs of candidate feature points extracting unit to extract a pair of feature points, which are included within a range of a region division element, from the feature points; pairs of final feature points extracting unit to extract pairs of final feature points, which satisfy the requirements of the region division element, from the pairs of candidate feature points; a critical line forming unit to form a critical line by connecting the pairs of final feature points; a region forming unit to form a final region in accordance with the size relationship between the regions formed of a closed curve which connects the critical line and the grid map; a topological map forming unit to form a topological map on the basis of the final region; and a displaying unit to display the topological map on a display device, wherein when a predetermined region of the topological map, which is recognizably displayed on the display device, is selected, the region is automatically cleaned.

According to another aspect, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 4 is a detailed flow chart of operation S220 of FIG. 2 according to an exemplary embodiment, in which final pairs of feature points are extracted.

DETAILED DESCRIPTION OF EMBODIMENTS

Figure 1:
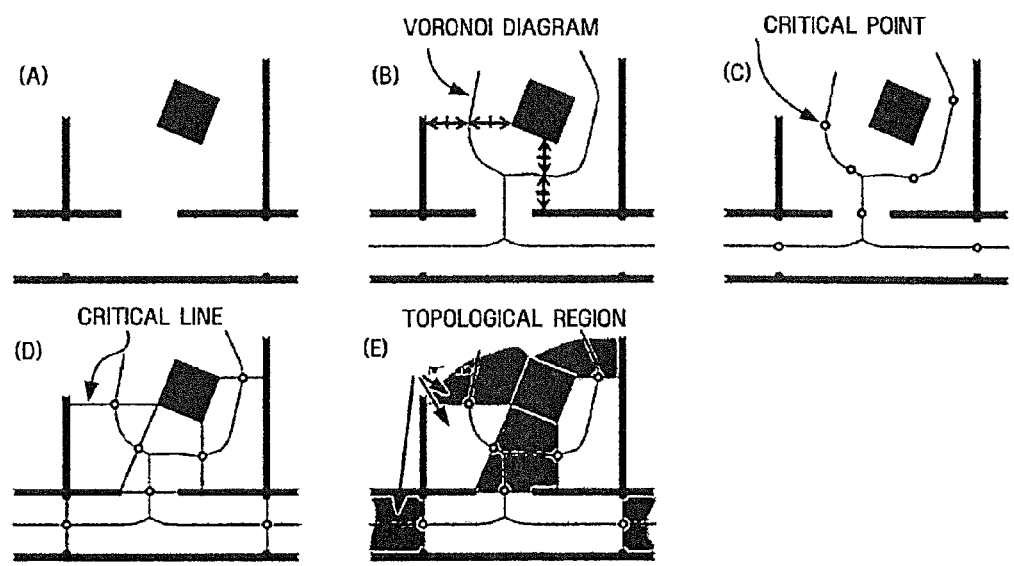
FIG. 1 is a view sequentially showing a method of drawing a topological map by detecting a narrow path with a Voronoi diagram.

Reference will now be made in detail to exemplary embodiments, examples of which are illustrated in the accompanying drawings, wherein like reference numerals refer to the like elements throughout. Exemplary embodiments are described below to explain the present invention by referring to the figures.

Figure 2:
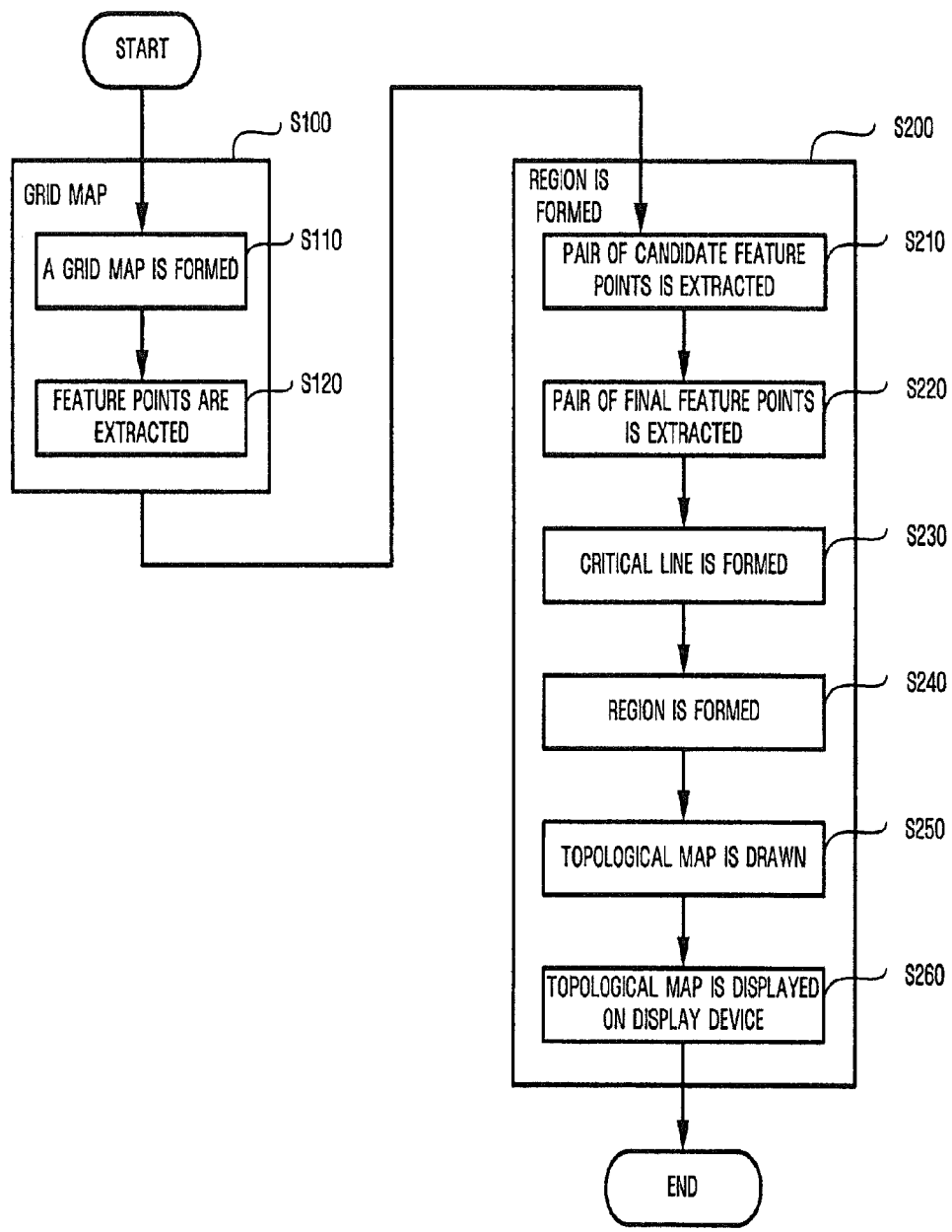
FIG. 2 is a flow chart showing a method of dividing regions by using feature points according to an exemplary embodiment.

FIG. 2 is a flow chart showing a method for dividing regions by using feature points according to an exemplary embodiment.

According to an exemplary embodiment, the method of dividing regions by using feature points includes operation S110 in which a grid map 30 is generated; operation S120 in which feature points 40 are extracted from the grid map 30; operation S210 in which a candidate pairs of feature points is extracted from the feature points 40; operation S220 in which final pairs of feature points having a feature of an gateway is extracted from the candidate pairs of feature points; operation S230 in which a critical line is generated by the final pairs of feature points; and operation S240 in which some critical lines between regions made by critical lines are pruned so as to generate a final region.

The method for dividing regions by using feature points may further include operation S250 in which a topological map is generated on the basis of the final region, and operation S260 in which the topological map is displayed on a display device.

In a left operation S100 (FIG. 2), the grid map 30 is generated and the feature points 40 are extracted to prepare to detect a gateway. In a right operation S200 (FIG. 2), a gateway is detected from the feature points 40 to finally generate the topological map.

For example, a robot cleaner having one or more sensors capable of detecting distances from obstacles autonomously moves in the entire regions of a free space so as to detect obstacles. In the case of a mobile robot generally used in a household, an obstacle denotes a structure such as an internal wall of a building and furniture. However, a mobile robot can be used in other environments and obstacles may include other structures. A mobile robot detects distances from obstacles so as to obtain grid points composed of many points. A sensor detecting distances from obstacles may use infrared rays, laser or supersonic waves, but the usage is not limited thereto and various methods can be embodied.

The grid map 30 is formed of external lines extracted from a plurality of lattice points obtained while the robot is traveling. Therefore, the mobile robot can generate the grid map 30 from the plurality of grid points obtained by a sensor (S110).

The feature points 40 can be extracted from the plurality of grid points and the grid map 30 (S120), and the feature point 40 denotes a corner of an internal wall of a building and/or an edge of a structure.

A RANSAC (Random Sample Consensus) algorithm can be used to extract the feature points 40. By the RANSAC algorithm, a plurality of lines is extracted from a plurality of grid points, thus, the feature points 40 are extracted by using points where lines are intersected.

In addition, by using a SLAM (Simultaneous Localization And Map building) algorithm, the feature points 40 can be extracted. By the SLAM algorithm, the location and peripheral map of the mobile robot is presumed on the basis of feature points obtained by a distance sensor and encoder information of the robot for update, thereby generating a map composed of feature points. The SLAM (Simultaneous Localization And Map building) algorithm is disclosed in detail in 'A Solution to the Simultaneous Localization and Map Building Problem' of a thesis IEEE Transactions on Robotics and Automation, Vol 17, No. 3, June 2001, and thus description thereof will be omitted. The feature points 30 can be extracted by various methods in addition to the above-described method.

Figure 3:
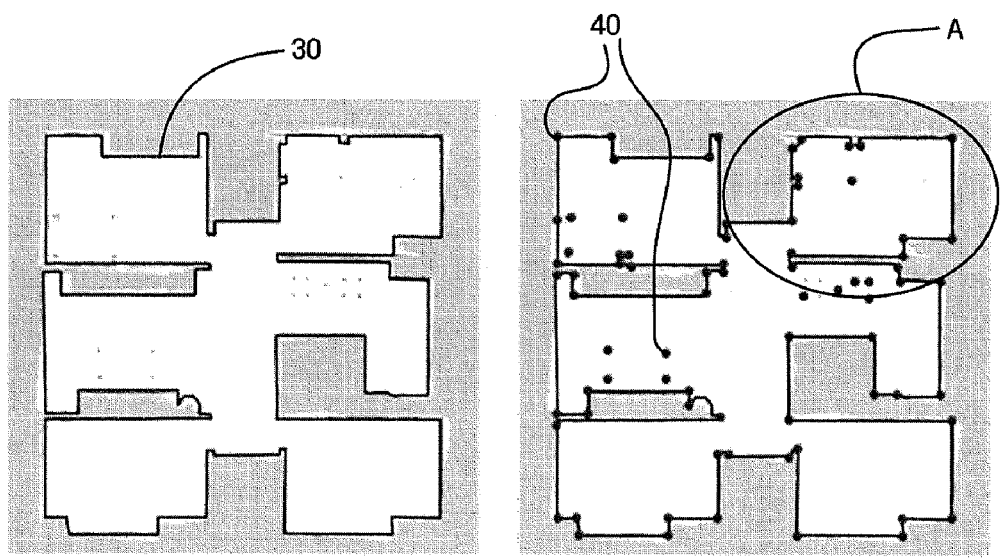
FIG. 3 is a view showing a grid map that is generated by using grid points according to an exemplary embodiment and feature points extracted from the grid map.

FIG. 3 is a view showing the grid map 30 that is generated by using grid points according to an exemplary embodiment and the feature points 40 extracted from the grid map 30.

Hereinafter, grid map means the grids occupied by the obstacles

FIG. 3 is a view showing the grid map 30 that is generated by using grid points according to an exemplary embodiment of the present invention and the feature points 40 extracted from the grid map 30. FIG. 3 (left side) is a view showing the feature points 40 extracted from the grid map 30. As shown in the drawing, most feature points 40 exist on the grid map 30 and, particularly, the feature points exist at corners where ends of lines meet in the grid map 30.

After the feature points 40 are extracted from the grid map 30, candidate pairs of feature points, included within the range of a region division element, are extracted from the feature points 40 (S210). Generally, a region division element dividing a region into a room and a living room may be a gateway such as an entrance door.

Candidate pairs of feature points, which are presumed as both ends of a gateway, is extracted from the feature points 40. Since both ends of a gateway are edges, they are recognized as the feature points 40 during the extraction. For example, a gateway may be a door, and doors typically have a size within a constant range. In addition, doors may have a uniform size in the entire space. Therefore, if a pair of feature points corresponding to a width of a door is extracted from distances between the extracted feature points 40, one of the pairs becomes a pair of feature points corresponding to a gateway.

Generally, a size of a wooden door, which is an example of a gateway, is as follows, when a frame is excluded (unit: mm).

2037 to 2040 (height)*937 to 940 (width)*36 (thickness)
2037 to 2040 (height)*837 to 840 (width)*36 (thickness)
2037 to 2040 (height)*737 to 740 (width)*36 (thickness)

Therefore, a distance between the feature points 40 which is candidate for a door, which is an example of a gateway, is in the range of a minimum 73.7 cm to a maximum 94.0 cm. Accordingly, a pair of feature points corresponding to a door is among the pair of feature points in the range of 73.7 to 94.0 cm.

When the grid map 30 is generated, grid points are formed at constant intervals, so that it is likely a grid point is not formed exactly at an edge point. Therefore, the feature point 40 may not indicate an exact edge point. Thus, it is desirable to consider noise that is generated because of the interval of the grid points. In this respect, it is preferable to extract candidate pairs of feature points in the range considering the noise generated due to the interval of grid points in the range of a width of a gateway such as a door. For example, if an interval of grid points is 1 cm, a pair of feature points in the range of 72.7 to 95.0 cm can be extracted. Because a gateway, such as a door which is out of the range of a width of a general door, may exist, candidate pairs of feature points can be extracted on the basis of a width that is directly input by a user.

Next, final pairs of feature points which satisfy the requirement of a region division element is extracted from the extracted candidate pairs of feature points in the above-described operation (S220). For example, if the region division element is an entrance door (an example of a gateway), both edges of a door are connected to a wall; thus, both edges are illustrated so as to be connected to a wall in the grid map 30. On the other hand, if an entrance door is opened, an obstacle does not exist between entrance doors, thus, a space between entrance doors is not illustrated in the grid map 30. In addition, the length of a closed curve formed by connecting a line of the candidate pair of feature points indicating an entrance door and the grid map 30 should have a substantially equal length to a boundary length of a room. A pair of feature points which satisfies the requirements of the region division element is extracted from many candidate pairs of feature points so as to obtain final pairs of feature points.

FIG. 4 is a detailed flow chart of operation S220 of FIG. 2 according to an exemplary embodiment of the present invention, in which final pairs of feature points is extracted.

As described above, an obstacle does not exist between gateways such as entrance doors, and the entrance door is not illustrated in the grid map 30. Therefore, if a line of the pairs overlaps with the grid map 30, the overlapped pair can be excluded from the candidate pairs of feature points because it is not the pair of feature points indicating an entrance (S222). When it is determined whether a line connecting feature points overlaps with the grid map 30 or not, it is preferable to determine that the line overlaps with the grid map 30 if a predetermined interval is interposed therebetween. This is because the feature points 40 may not be extracted from the grid map 30 and exist on the grid map 30. However, since the feature points are extracted from the grid map 30, the feature points are likely located in positions very adjacent to the grid map 30 even if the feature points are located out of the grid map 30. In the following description, even the feature points 40 existing at edges of the grid map 30 do not necessarily overlap with the grid map 30, as long as the feature points 40 are located in positions very adjacent to the grid map 30.

In addition, as described above, since both edges of a gateway such as an entrance door are connected to walls, a line connecting feature points is not illustrated in the grid map 30, but each pair of feature points is connected to other feature points 40 thereby forming the grid map 30. Therefore, if the feature points 40 correspond to a gateway such as an entrance door, each point of the pair of feature points should exist on the grid map 30. Therefore, if the feature points forming a pair do not exist on the grid map 30, the pair is excluded from the candidate pairs of feature points (S224).

Even after undergoing the above-described two operations (S222, S224), pairs of feature points that are not final pairs of feature points indicating a gateway such as an entrance door may exist among the candidate pairs of feature points. A total sum of a length of a closed curve formed by connecting a line of a candidate pair of feature points and the grid map 30 should be substantially equal to a boundary of a room. The range of the boundary of a room can be defined so as to be proportional to the size of the entire free space. For example, in the case of an apartment of 45 pyeong (a unit of area), the size of a normal room is in the range of 6 $m^2$ to 70 $m^2$, and the boundary thereof is in the range of 10 m to 40 m. Therefore, if the length of a closed curve is not in the range of the boundary of a room, it can be excluded (S226). A user can directly input the circumferential length of a room, so that final pairs of feature points can be extracted from the candidate pairs of feature points on the basis of the length.

With reference to FIGS. 5A, 5B, and 5C and FIGS. 6A and 6B, a process of obtaining final pairs of feature points from the candidate pairs of feature points will be described with an example.

Figure 5A:
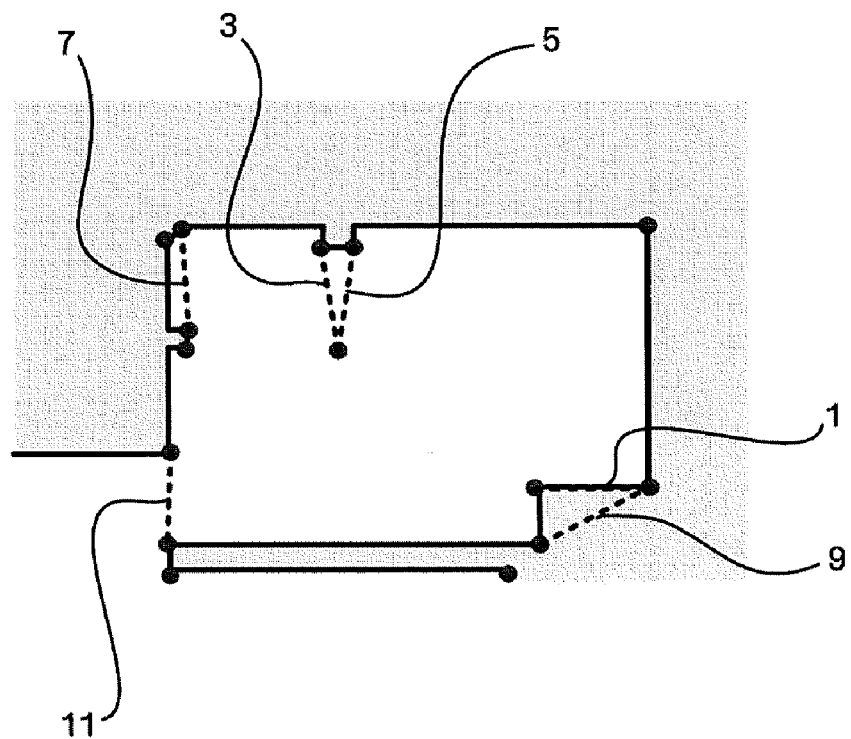
FIGS. 5A, 5B, and 5C are enlarged views of part A of FIG. 3, in which a final pair of feature points is extracted from candidate pairs of feature points, on the basis of requirement of a gateway.
Figure 5B:
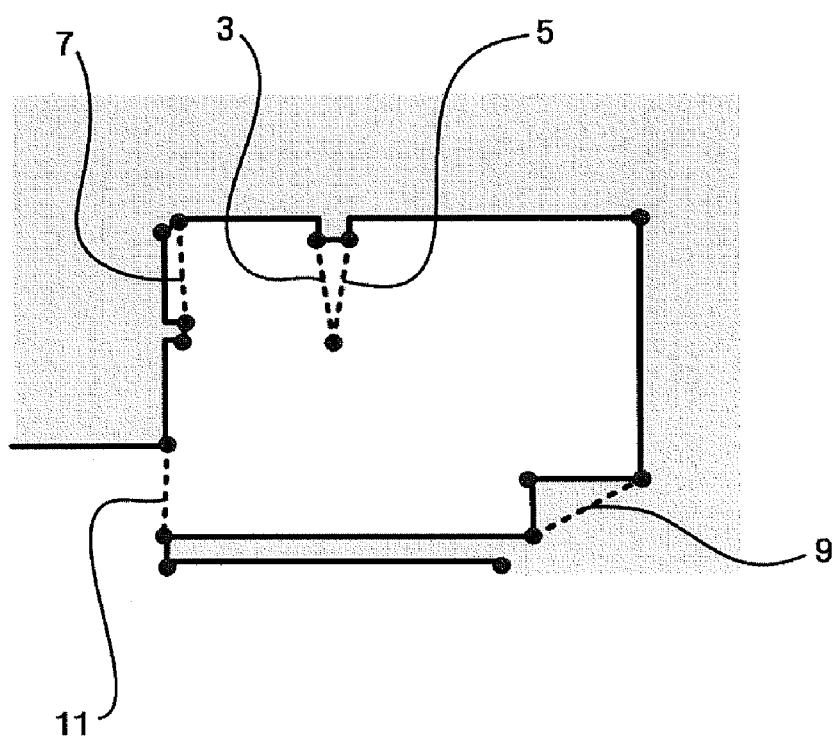
Figure 5C:
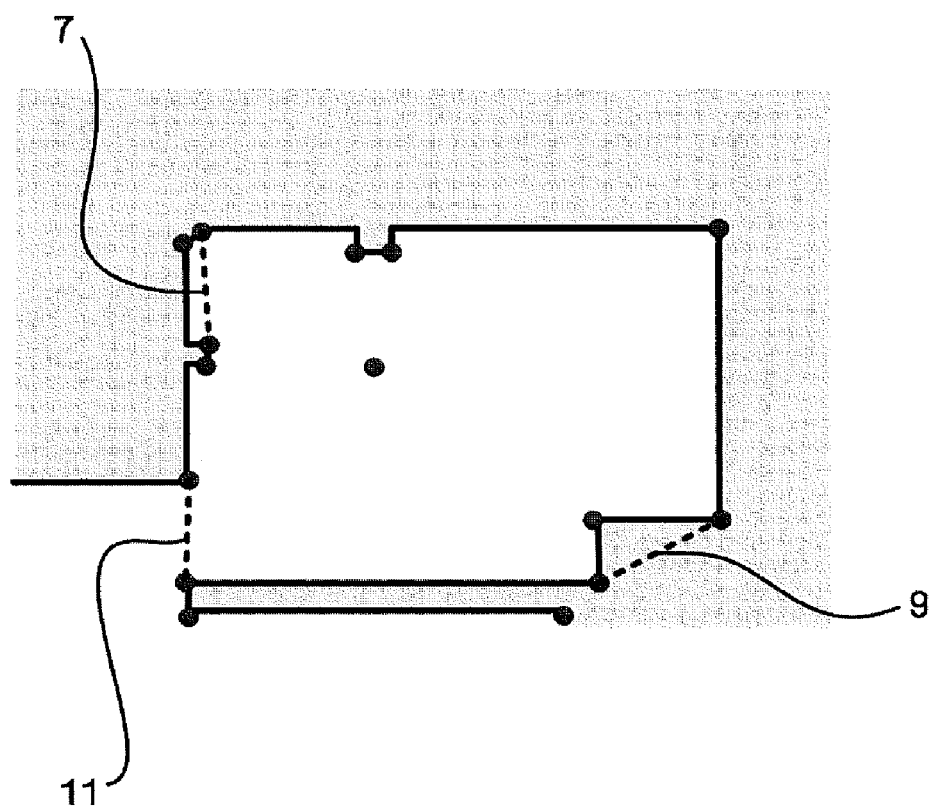

FIGS. 5A, 5B, and 5C are enlarged views of part A of FIG. 3, final pairs of feature points are extracted from the candidate pairs of feature points, on the basis of requisites of a gate.

Candidate pairs of feature points extracted from the feature points 40, on the basis of the width of an entrance door (1, 3, 5, 7, 9, and 11) (an example of a gateway) are illustrated in FIG. 5A. Hereinafter, the candidate pairs of feature points (1, 3, 5, 7, 9, and 11) will be denoted by its own reference numeral, such as a pair of feature points 1, a pair of feature points 3.

As for the pair of feature points 1 and 9, a line connecting the feature points 40 overlaps with the grid map 30. Therefore, the pair of feature points 1 is excluded from the final pairs of feature points as shown in FIG. 5B. The rest candidate pairs of feature points (3, 5, 7, and 11) do not overlap with the grid map 30.

When a pair of feature points 3 and a pair of feature points 5 are taken among the pairs of feature points (3, 5, 7, and 11) shown in FIG. 5B, one feature point of the pair is away from the grid map 30. Therefore, the grid map 30 does not include all points of the pair of feature points 3 and the pair of feature points 5. Accordingly, because the pairs do not satisfy the aspect that the feature points 40 forming an entrance door should be connected to walls, the pair of feature points 3 and the pair of feature points 5 are excluded from the final pairs of feature points. The grid map 30 includes all feature points 40 of the rest candidate pairs of feature points (7, and 11).

Figure 6A:
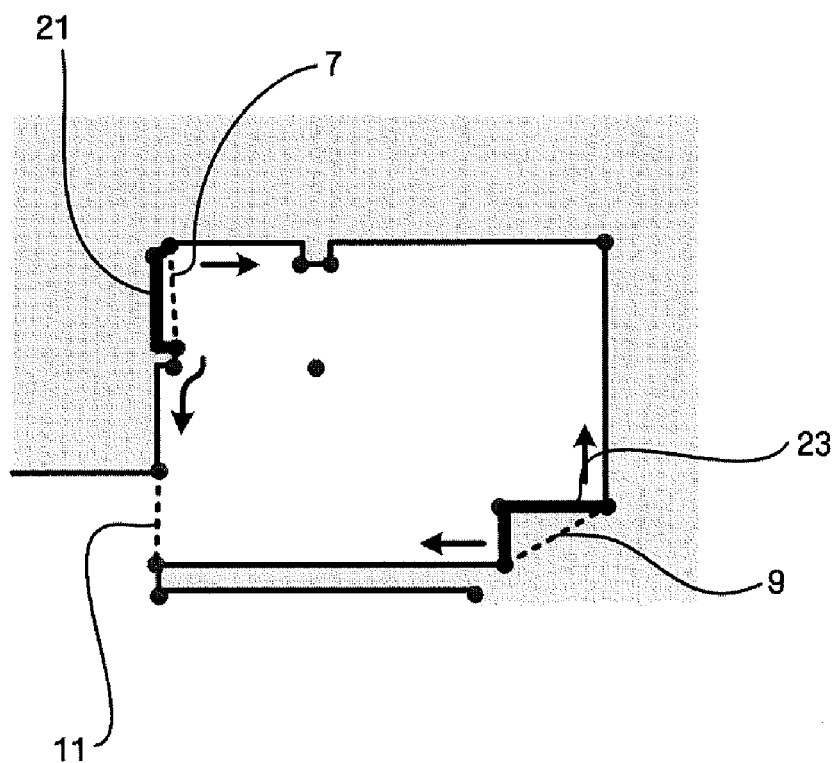
FIGS. 6A and 6B are enlarged views of part A of FIG. 3, showing a process of extracting a final pair of feature points from the candidate pairs of feature points, by comparing the length of a closed curve formed by connecting a line, which connects candidate feature points, and the grid map to the boundary of a room.

As described with reference to FIGS. 5A, 5B, and 5C, even after undergoing the aforementioned two operations, a pair of feature points that is not a final pair of feature points indicating an entrance door may exist among the candidate pairs of feature points, as shown in FIG. 6A. Three candidate pairs of feature points (7, and 11) remain, but a room generally has one door.

Figure 6B:
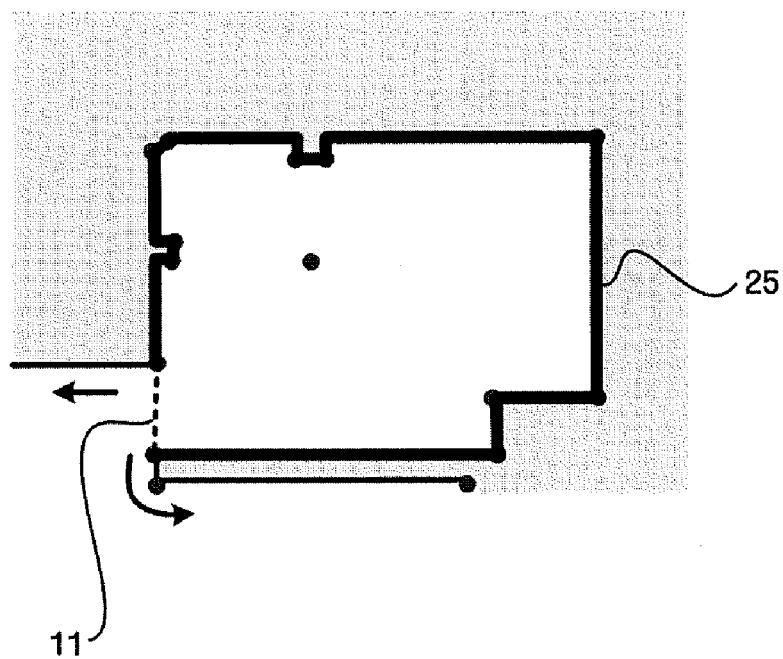

FIGS. 6A and 6B are enlarged views of part A of FIG. 3, showing a process of extracting final pairs of feature points from the candidate pairs of feature points, by comparing the length of a closed curve formed by connecting a line, which connects candidate feature points, and the grid map 30 to the boundary of a room.

A closed curve can be formed by connecting a line of a pair of feature points 7 and the grid map 30 drawn by a thick line 21 in the drawing. A closed curve can be formed by connecting a line of the pair of feature points 7 and the grid map 30 which is drawn near the pair of feature points 7 in an arrow direction. In this case, a smaller region of the two closed curve is selected so as to determine whether the requirements of the final pairs of feature points are satisfied or not. If a closed curve formed of the thick line 21 of FIG. 6A is taken, the boundary of the closed curve is too small, as compared to the boundary of a normal room. Therefore, the pair of feature points 7 is excluded from the final pairs of feature points.

As described above, two closed curves can be formed by connecting a pair of feature points 11 and the grid map 30. As shown in FIG. 6B, the boundary of a smaller closed curve that is formed of a thick line 25 is similar to the boundary of a normal room. Therefore, the pair of feature points 11 which satisfies the requirements of the aforementioned operations will become final pairs of feature points.

After final pairs of feature points are extracted, a critical line is generated by connecting the pairs (S230). As an example generated for the entire region, a critical line is drawn by a dotted line in FIG. 8A, and it will be described in detail with reference to the drawings.

Some critical lines are pruned from a region that is formed of the generated critical line and the grid map 30 so as to form a final region (S240).

Figure 7:
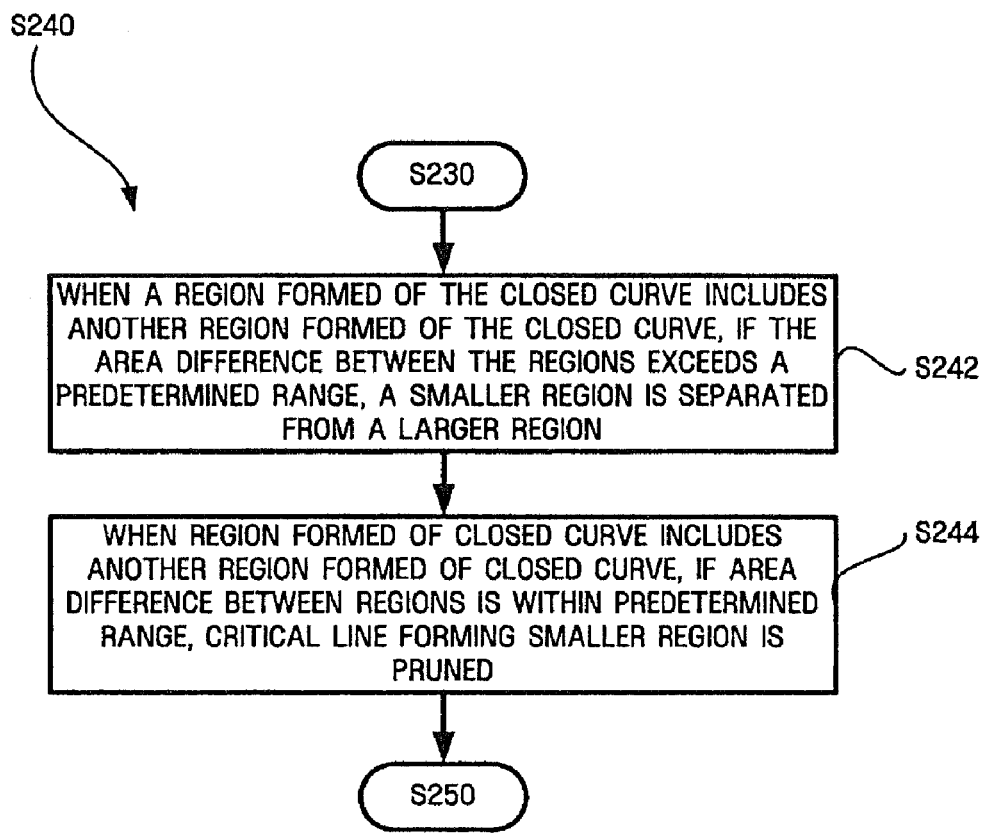
FIG. 7 is a detailed flow chart of operation S240 of FIG. 2 according to an exemplary embodiment in which regions are formed.

FIG. 7 is a detailed flow chart of operation S240 of FIG. 2 according to an exemplary embodiment in which regions are formed.

First, when a region formed by connecting critical lines and the grid map 30 includes a region formed by connecting other critical line and the grid map, if the area difference between the regions exceeds a predetermined range, a smaller region is separated from a larger region (S242). Preferably, the predetermined range is set to half the area of the smallest room, approximately, below 3.3 m. This is because if the area difference between the regions is larger than the range, a region that is formed by subtracting the smaller region from the larger region may include regions, such as a room and a living room.

In addition, when a region formed by connecting a critical line and the grid map 30 includes a region formed by connecting other critical line and the grid map, if the area difference between the regions is within a predetermined range, the critical line forming a smaller region are pruned to select a larger region (S244). This is because if the area difference between the regions is smaller than the range, a region that is formed by subtracting the smaller region from the larger region is too small to recognize. Generally, the predetermined range is preferably set to half the area of the smallest room, With reference to FIGS. 8A, 8B, and 8C, a process of forming a recognizable region by the critical lines will be described with an example.

Figure 8A:
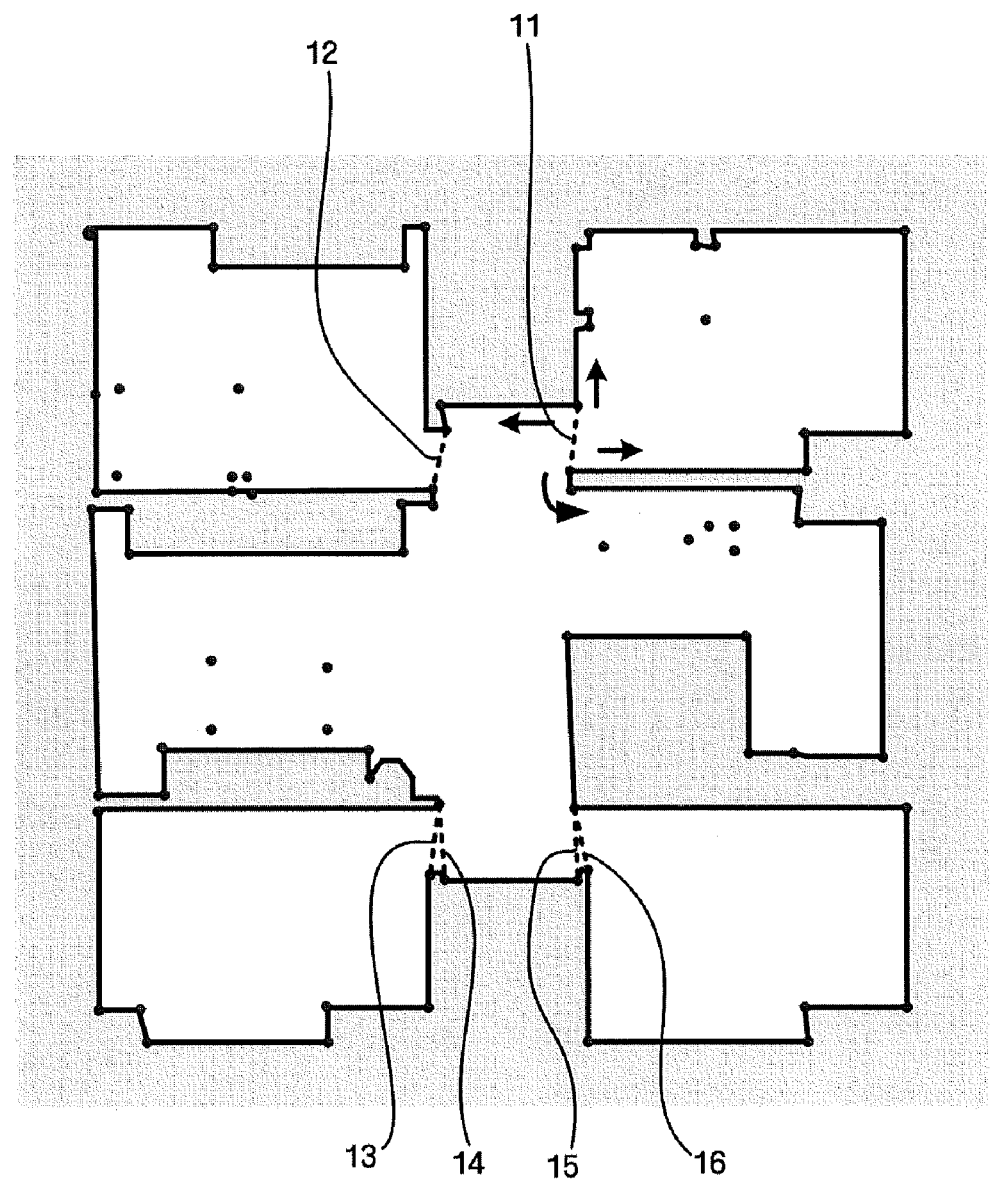
FIGS. 8A, 8B, and 8C are views showing a process of forming final regions by generated critical lines.
Figure 8B:
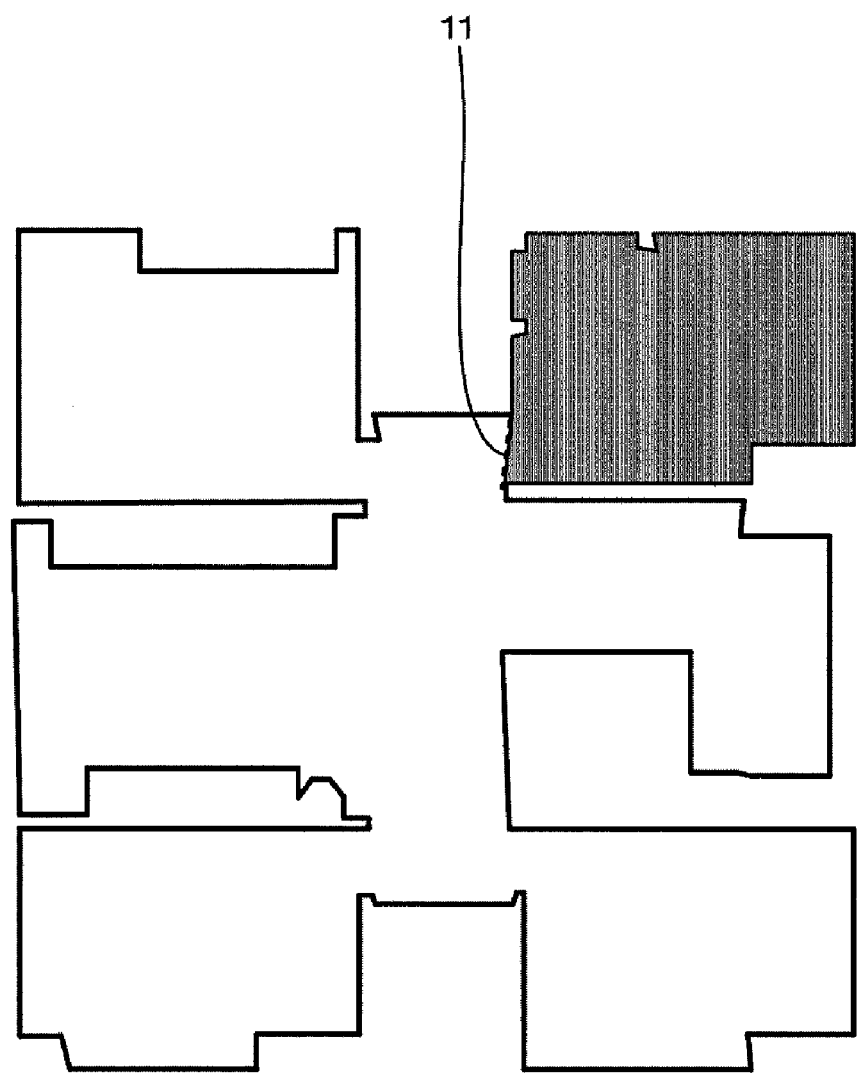
Figure 8C:
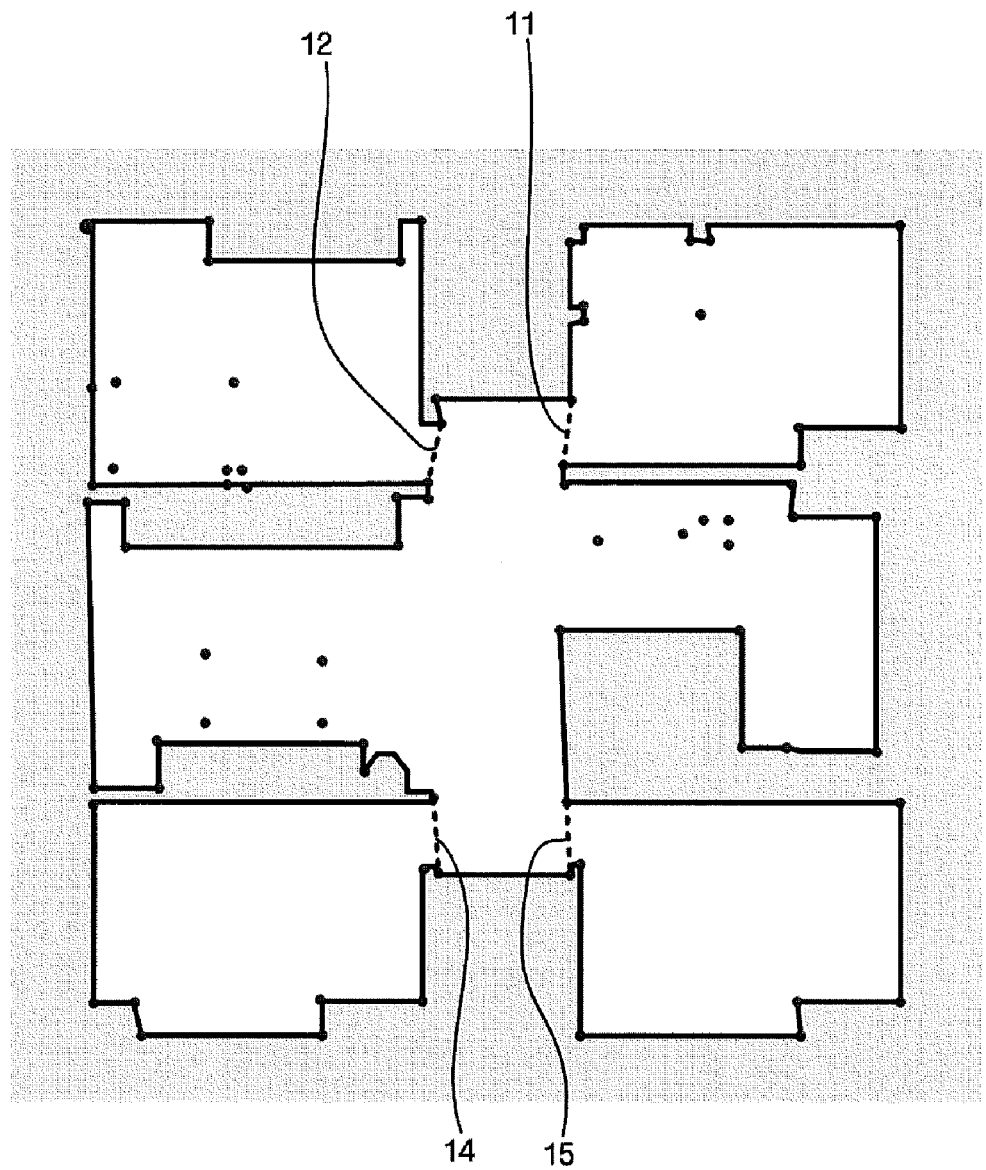

FIGS. 8A, 8B, and 8C are views showing a process of forming final regions by the generated critical lines.

Critical lines (11, 12, 13, 14, 15, and 16) that are generated from the final pairs of feature points are illustrated in FIG. 8A. Hereinafter, the critical lines (11, 12, 13, 14, 15 and 16) will be denoted by its own reference numeral, such as a critical line 11, a critical line 12.

When the critical line 11 is taken, two arrows exist at the right and left sides of the critical line 11 in FIG. 8A. When the critical line 11 is connected to the grid map 30 in two arrow directions, the two arrows located at the right side of the critical line, a region is formed. Moreover, when the critical line 11 is connected to the grid map 30 in two arrow directions, the two arrows located at the left side of the critical line, a region is formed as well. In this case, the critical line divides a region into two regions, and a smaller region of the two is selected to form a region. Therefore, a dark region of FIG. 8B is formed by the critical line 11. Likewise, each region can be formed by the critical line (12, 13, 14, 15, and 16).

Even though regions are formed by the critical lines, they are not final regions. This is because some regions overlap with each other and the overlapped regions should be dealt with. For example, when regions that are formed by the critical lines 13 and 14 are taken into account, an overlapped region is formed between the two regions that are formed by each critical line. That is, a region that is formed by the critical line 14 includes a region that is formed by the critical line 13. In this case, because the difference between the two regions is much smaller than half the area of the smallest room, the critical line 13 is pruned and a larger region is selected. As well in the case of the critical lines 15 and 16, a region that is formed by the critical line 15 is selected and the critical line 16 is pruned.

The critical lines (11, 12, 14, and 15) finally remain after undergoing the process of pruning some critical lines and they are shown in FIG. 8C. FIG. 8C is a view showing the finally remaining critical lines after undergoing a process of pruning some critical lines. The entire region is divided into five final regions by using the critical lines and the grid map 30.

Figure 9:
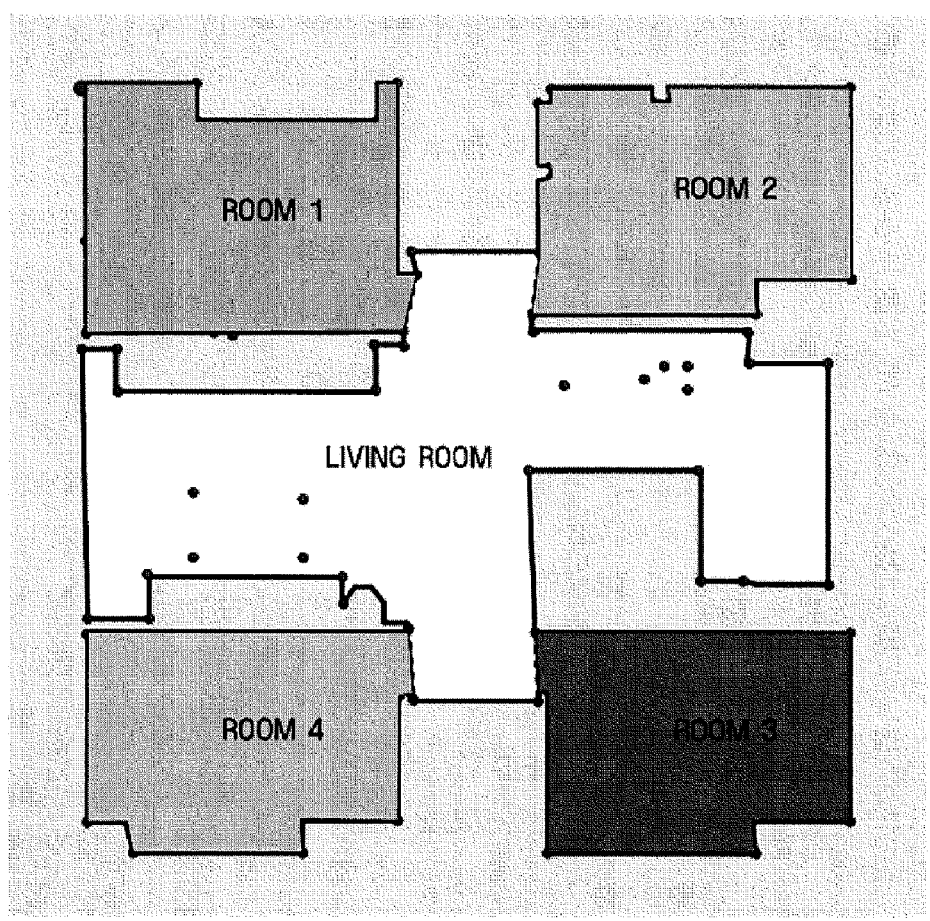
FIG. 9 is a view showing a topological map that is generated according to an exemplary embodiment.

FIG. 9 is a view showing a topological map that is generated according to an exemplary embodiment.

The closed curves of the regions that are divided by undergoing the aforementioned operations have different colors from each other for different recognition, so as to draw a topological map as shown in FIG. 9 (S250).

After drawing the topological map, the divided regions may have names, such as a room 1, a room 2, and a living room.

The topological map can be displayed on a separate display device (S260). In the case of a robot cleaner, if a user selects an arbitrary region (a room 1, a living room, etc) to clean, the robot cleaner recognizes the selected region and cleans.

Figure 10:
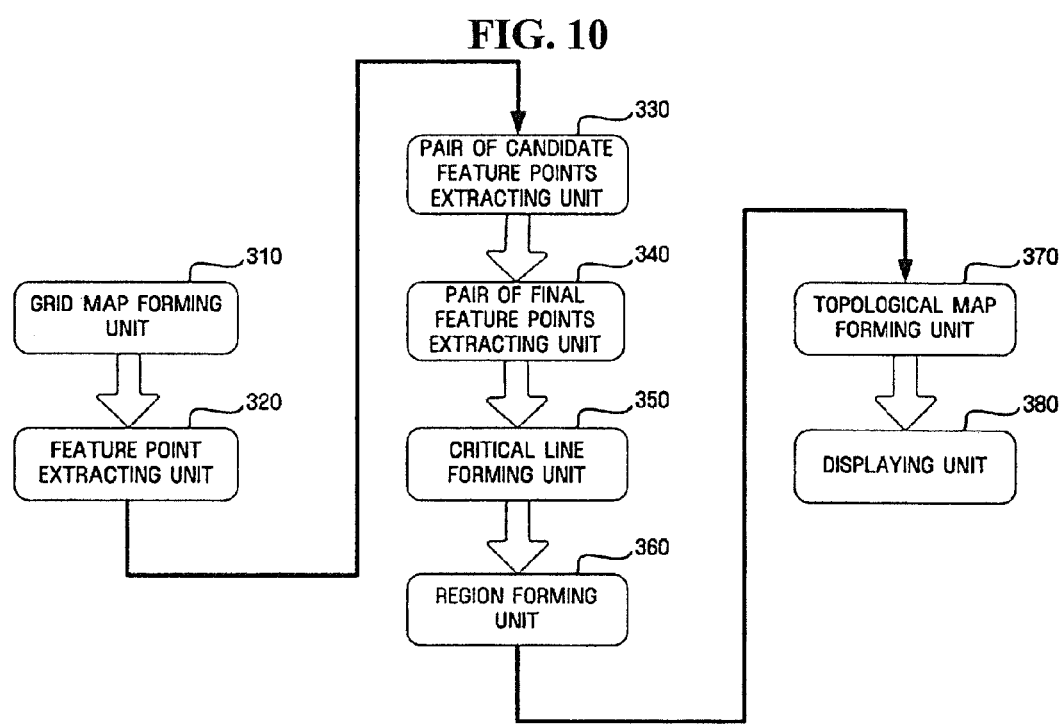
FIG. 10 is a block diagram of an apparatus for dividing regions by using feature points according to an exemplary embodiment.

FIG. 10 is a block diagram of an apparatus of dividing regions by using the feature points 40 according to an exemplary embodiment.

The apparatus of dividing regions by using the feature points 40 according to an exemplary embodiment includes a grid map generating unit 310, a feature point extracting unit 320, candidate pairs of feature point extracting unit 330, final pairs of feature points extracting unit 340, a critical line forming unit 350, and a region forming unit 360, to divide the entire region into recognizable regions.

The apparatus of dividing regions may further include a topological map drawing unit 370 and a display unit 380.

The grid map generating unit 310 draws the grid map 30 by using the plurality of grid points that are obtained by detecting distances from obstacles. At this time, the distances from obstacles can be detected by using infrared rays, laser or supersonic waves, but the usage is not limited thereto and the distances from obstacles can be detected by using various methods.

The feature point extracting unit 320 extracts the feature points 40 from the grid map 30 that is formed by the grid map generating unit 310. The feature points 40 can be extracted to form a feature point map by using the RANSAC algorithm or the SLAM (Simultaneous Localization And Map building) algorithm, and the algorithm is not limited thereto to extract the feature points 40.

The candidate pairs of feature points extracting unit 330 extracts candidate pairs of feature points, which is in the range of the region division element, from the feature points 40 extracted from the feature point extracting unit 320. The range of the region division element when candidate pairs of feature points are extracted is set on the basis of a width of a gateway such as the width of an entrance door. It is preferable to extract a pair of feature points within the range set in consideration of noise which is added to the width of a gateway due to the interval between grid points.

The final pairs of feature points extracting unit 340 extracts the feature points, which satisfy the requirements of the region division element, from the candidate pairs of feature points which is extracted by the candidate pairs of feature points extracting unit 330. At this time, if a line of the pair of feature points overlaps with the grid map 30, the overlapped pair is excluded so as to extract final pairs of feature points from the candidate pairs of feature points. Further, if the grid map 30 does not include a pair of feature points 40, the pair of feature points 40 is excluded so as to extract final pairs of feature points from the candidate pairs of feature points. If the length of a closed curve formed by connecting a line of the pair of feature points and the grid map 30 is within a predetermined range, the pair of feature points is extracted from the candidate pairs of feature points to become the final pairs of feature points. At this time, the predetermined range is set on the basis of the boundary of a room.

The critical line forming unit 350 forms critical lines by connecting the pairs of feature points extracted from the final pairs of feature points extracting unit.

The region forming unit 360 prunes some critical lines between regions formed by a closed curve which connects critical lines that are generated by critical line forming unit 350 and the grid map 30, and generates a final region. At this time, when a region formed by connecting the critical line and the grid map 30 includes a region formed by connecting other critical line and the grid map, a smaller region can be separated from a larger region. If the area difference between the regions is within a predetermined range, the critical line forming the smaller region is pruned to select the larger region. Preferably, the predetermined range is set to half the area of the smallest room.

The topological map drawing unit 370 draws a topological map on the basis of the final region that is formed by the region forming unit 360.

The display unit 380 displays the topological map on the display device. At this time, each region can be recognized by, for example, making different the color of each region, and a user can select the divided regions with each color.

When the above-described device is mounted in the robot cleaner and a user selects a predetermined region, among a topological map region that is recognizably displayed on the display device, the robot recognizes the selected region so as to automatically clean the region.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of the present invention, or they may be of the kind well-known and available to those skilled in the art of computer hardware and/or computer software.

Exemplary embodiments of a method, apparatus, and medium for dividing regions by using the above-described feature points are not limited to a robot cleaner, but these exemplary embodiments can be applied to a security robot, a guide robot, a service robot, any mobile robot, etc.

Exemplary embodiments described above have one or more beneficial effects as follows.

First, as the grid map is divided into recognizable regions, such as a room, a living room, etc., a user can designate a region in a convenient manner.

Second, critical lines can be extracted to simply divide regions with little calculation by using feature points extracted from the grid map.

Third, when the drawn topological map is displayed on the display device of the robot cleaner, and a user selects a divided predetermined region, the robot cleaner can clean the region.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A method for dividing regions by using feature points, the method comprising: forming a grid map by using a plurality of grid points that are obtained by detecting obstacles; extracting feature points from the grid map; extracting pairs of final feature points, which satisfy requirements of a region division element, from the feature points; forming a critical line by connecting the pairs of final feature points to each other; and forming a final region in accordance with the size relationship between regions having a closed curve formed by connecting the critical line and the grid map, wherein the forming of the final region comprises separating a smaller region from a larger region when the smaller region formed of the closed curve is included in the larger region formed of the closed curve and the area difference between the smaller region and the larger region exceeds a predetermined range.

2. The method of claim 1, wherein, in the forming of the grid map, the grid points are obtained by detecting distances from the obstacles and the distances are detected by using any one of infrared ray sensor, laser sensor, or supersonic wave sensor.

3. The method of claim 1, wherein the extracting of the feature points comprises extracting the feature points by using a RANSAC (random sample consensus) algorithm.

4. The method of claim 1, wherein the extracting of the feature points comprises extracting the feature points by using a SLAM (Simultaneous Localization And Map building) algorithm.

5. The method of claim 1, wherein the predetermined range is set on the basis of half the area of the smallest region.

6. At least one non-transitory computer readable medium storing computer readable instructions that control at least one processor to implement the method of claim 1.

7. The method of claim 1, wherein the forming of the final region comprises pruning a critical line forming the smaller region when the smaller region formed of the closed curve is included in the larger region formed of the closed curve and the area difference between smaller region and the larger region is within a predetermined range.

8. The method of claim 7, wherein the predetermined range is set on the basis of half the area of the smallest room.

9. The method of claim 1, wherein the forming of the final region comprises pruning a critical line forming the smaller region when the smaller region formed of the closed curve is included in the larger region formed of the closed curve and the area difference between the smaller region and the larger region is within a predetermined range.

10. The method of claim 9, wherein the predetermined range is set on the basis of half the area of the smallest region.

11. The method of claim 1, further comprising drawing a topological map on the basis of the final region that is formed in the forming of the final region.

12. The method of claim 11, further comprising displaying the topological map on a display device.

13. The method of claim 1, wherein the extracting pairs of final feature points includes extracting candidate pairs of feature point, which are included in a distance range of the region division element, from the feature points, and the pairs of final feature points, which satisfy requirements of the region division element, are extracted from the pairs of candidate feature points.

14. The method of claim 13, wherein, in the extracting of the pairs of candidate feature points, a distance range of the region division element is set on the basis of a width of a gateway.

15. The method of claim 14, wherein the extracting of the pairs of candidate feature points from the feature points comprises extracting pairs of candidate feature points, which are included within the distance range set in consideration of noise due to interval between grid points in range of the width of the gateway.

16. The method of claim 13, wherein the extracting of the pairs of final feature points further comprises extracting the pairs of final feature points, in which the length of a closed curve formed by connecting a line of the pair of feature points and the grid map is within a predetermined length range.

17. The method of claim 16, wherein the predetermined length range is set on the basis of the boundary of a room.

18. The method of claim 13, wherein the extracting of the pairs of final feature points comprises extracting pairs of final feature points except that a line connecting the pair of feature points overlaps with the grid map.

19. The method of claim 18, wherein the extracting of the pairs of final feature points further comprises extracting the pairs of final feature points, in which the length of a closed curve formed by connecting a line of the pair of feature points and the grid map is within a predetermined length range.

20. The method of claim 19, wherein the predetermined length range is set on the basis of the boundary of a room.

21. The method of claim 18, wherein the extracting of the pairs of final feature points further comprises extracting pairs of final feature points except that a pair of feature points is not included in the grid map.

22. The method of claim 21, wherein the extracting of the pairs of final feature points further comprises extracting the pairs of final feature points, in which the length of a closed curve formed by connecting a line of the pair of feature points and the grid map is within a predetermined length range.

23. The method of claim 22, wherein the predetermined length range is set on the basis of the boundary of a room.

24. An apparatus for dividing regions by using feature points, the apparatus comprising: a grid map forming unit to form a grid map by using a plurality of grid points that are obtained by detecting obstacles; a feature point extracting unit to extract feature points from the grid map; pairs of final feature points extracting unit to extract pairs of final feature points, which satisfy the requirements of a region division element, from the feature points; a critical line forming unit to form a critical line by connecting the pairs of final feature points; and a region forming unit to form a final region in accordance with the size relationship between the regions formed of a closed curve which connects the critical line and the grid map, wherein the region forming unit separates a smaller region from a larger region when the smaller region formed of the closed curve is included in the larger region formed of the closed curve and the area difference between the smaller region and the larger region exceeds a predetermined range.

25. The apparatus of claim 24, wherein the grid points are obtained by detecting distance from the obstacles and the distances are detected by using any one of infrared ray sensor, laser sensor, or supersonic wave sensor.

26. The apparatus of claim 24, further comprising pairs of candidate feature points extracting unit to extract a pair of feature points, which are included in a distance range of the region division element, from the feature points,
wherein, the pairs of final feature points extracting unit extracts the pairs of final feature points, which satisfy requirements of the region division element from the pairs of candidate feature points.

27. The apparatus of claim 24, wherein the feature points are extracted by using a RANSAC algorithm.

28. The apparatus of claim 24, wherein the feature points are extracted by using a SLAM (Simultaneous Localization And Map building) algorithm.

29. The apparatus of claim 24, wherein the predetermined range is set on the basis of half the area of the smallest region.

30. The apparatus of claim 24, wherein the range of the region division element, when the pairs of candidate feature points extracting unit extracts candidate pairs of feature points, is set on the basis of a width of an gateway.

31. The apparatus of claim 30, wherein the pairs of candidate feature points extracting unit extracts the pairs of candidate feature points, which are within a distance range set in consideration of noise generated due to interval between grid points in range of the width of the gateway.

32. The apparatus of claim 24, wherein the pairs of final feature points extracting unit further extracts the pairs of final feature points, in which the length of a closed curve formed by connecting a line of the pair of feature points and the grid map is within a predetermined length range.

33. The apparatus of claim 32, wherein the predetermined range is set on the basis of the boundary of a room.

34. The apparatus of claim 24, wherein the forming of the final region prunes a critical line forming the smaller region when the smaller region formed of the closed curve is included in the larger region formed of the closed curve and the area difference between the smaller region and the larger region is within a predetermined range.

35. The apparatus of claim 34, wherein the predetermined range is set on the basis of half the area of the smallest region.

36. The apparatus of claim 24, further comprising a topological map forming unit to form a topological map on the basis of the final region.

37. The apparatus of claim 36, further comprising a displaying unit to display the topological map on a display device.

38. The apparatus of claim 24, wherein the forming of the final region prunes a critical line forming the smaller region when the smaller region formed of the closed curve is included in the larger region of the closed curve and the area difference between the smaller region and the larger region is within a predetermined range.

39. The apparatus of claim 38, wherein the predetermined range is set on the basis of half the area of the smallest region.

40. The apparatus of claim 24, wherein the apparatus is part of a mobile robot.

41. The apparatus of claim 40, wherein the mobile robot is a cleaning robot.

42. The apparatus of claim 24, wherein the pairs of final feature points extracting unit extracts the pairs of final feature points, and wherein when a line connecting any pair of feature points overlaps with the grid map, the pair of feature points pertaining to the line is excluded from the extracted pairs of final feature points.

43. The apparatus of claim 42, wherein the pairs of final feature points extracting unit further extracts the pairs of final feature points, in which the length of a closed curve formed by connecting a line of the pair of feature points and the grid map is within a predetermined length range.

44. The apparatus of claim 43, wherein the predetermined range is set on the basis of the boundary of a room.

45. The apparatus of claim 42, wherein the pairs of final feature points extracting unit extracts the pairs of final feature points, and wherein when any pair of feature points is not included in the grid map, the pair of feature points not included in the grid map are excluded from the extracted pairs of final feature points.

46. The apparatus of claim 45, wherein the pairs of final feature points extracting unit further extracts the pairs of final feature points, in which the length of a closed curve formed by connecting a line of the pair of feature points and the grid map is within a predetermined length range.

47. The apparatus of claim 46, wherein the predetermined range is set on the basis of the boundary of a room.

48. A mobile robot having an apparatus for dividing regions by using feature points, the apparatus comprising: a grid map forming unit to form a grid map by using a plurality of grid points that are obtained by detecting obstacles; a feature point extracting unit to extract feature points from the grid map; pairs of final feature points extracting unit to extract pairs of final feature points, which satisfy the requirements of a region division element, from the feature points; a critical line forming unit to form a critical line by connecting the pairs of final feature points;
a region forming unit to form a final region in accordance with the size relationship between the regions formed of a closed curve which connects the critical line and the grid map, wherein the region forming unit separates a smaller region from a larger region when the smaller region formed of the closed curve is included in the larger region formed of the closed curve and the area difference between the smaller region and the larger region exceeds a predetermined range.

49. The mobile robot of claim 48, wherein the mobile robot is a cleaning robot.

50. The mobile robot of claim 48, wherein the grid points are obtained by detecting distance from the obstacles and the distances are detected by using any one of infrared ray sensor, laser sensor, or supersonic wave sensor.

51. The mobile robot of claim 48, further comprising pairs of candidate feature points extracting unit to extract a pair of feature points, which are included in a distance range of region division element, from the feature points,
   wherein the pairs of final points extracting unit extracts the pairs of final feature points, which satisfy requirements of the region division element from the pairs of candidate feature points.

52. The mobile robot of claim 48, further comprising a topological map forming unit to form a topological map on the basis of the final region.

53. The mobile robot of claim 52, further comprising a displaying unit to display the topological map on a display device,
   wherein when a predetermined region of the topological map, which is recognizably displayed on the display device, is selected, the region is automatically cleaned.

* * * * *

UNITED STATES PATENT AND TRADEMARK OFFICE
CERTIFICATE OF CORRECTION

PATENT NO. : 8,326,019 B2
APPLICATION NO. : 13/050459
DATED : December 4, 2012
INVENTOR(S) : Su-jinn Lee et al.

Page 1 of 1

It is certified that error appears in the above-identified patent and that said Letters Patent is hereby corrected as shown below:

In the Claims

In Col. 12, Line 15, In Claim 7, delete "smaller" and insert -- the smaller --, therefor.

In Col. 13, Line 38, In Claim 26, delete "wherein," and insert -- wherein --, therefor.

In Col. 15, Line 8, In Claim 51, delete "region" and insert -- the region --, therefor.

Signed and Sealed this
Fifteenth Day of October, 2013

Teresa Stanek Rea
*Deputy Director of the United States Patent and Trademark Office*